United States Patent
Emery

(10) Patent No.: US 9,502,938 B2
(45) Date of Patent: Nov. 22, 2016

(54) WRAPPED STATOR COIL FOR USE IN A GENERATOR

(71) Applicant: Siemens Energy, Inc., Orlando, FL (US)

(72) Inventor: Franklin T. Emery, Eighty Four, PA (US)

(73) Assignee: SIEMENS ENERGY, INC., Orlando, FL (US)

( * ) Notice: Subject to any disclaimer, the term of this patent is extended or adjusted under 35 U.S.C. 154(b) by 292 days.

(21) Appl. No.: 14/255,990

(22) Filed: Apr. 18, 2014

(65) Prior Publication Data

US 2015/0303758 A1    Oct. 22, 2015

(51) Int. Cl.
*H02K 1/00* (2006.01)
*H02K 3/30* (2006.01)
*H02K 3/40* (2006.01)

(52) U.S. Cl.
CPC . *H02K 3/30* (2013.01); *H02K 3/40* (2013.01)

(58) Field of Classification Search
CPC ......... H02K 3/345; H02K 3/30; H02K 3/522
USPC ....................................................... 310/196
See application file for complete search history.

(56) References Cited

U.S. PATENT DOCUMENTS

| | | | |
|---|---|---|---|
| 5,945,764 A * | 8/1999 | Bendfeld | H02K 3/40 174/109 |
| 6,420,812 B1 | 7/2002 | Emery | |
| 6,498,415 B1 | 12/2002 | Emery | |
| 7,135,639 B2 | 11/2006 | Emery | |
| 7,427,712 B2 | 9/2008 | Emery | |
| 8,395,296 B2 | 3/2013 | Emery | |
| 2007/0114052 A1* | 5/2007 | Emery | H02K 3/40 174/36 |
| 2009/0078450 A1* | 3/2009 | Miller | C09J 7/04 174/209 |

FOREIGN PATENT DOCUMENTS

EP    2203535 B1    8/2011

* cited by examiner

*Primary Examiner* — Hanh Nguyen

(57) ABSTRACT

A wrapped stator coil for use in a generator is provided comprising: an electrical conductor coil; an insulating layer structure disposed about the electrical conductor coil; an interwoven layer structure disposed about the insulating layer structure and comprising insulating material and a first conductive material; and a conductive layer structure disposed about the interwoven layer structure and comprising a second conductive material.

13 Claims, 3 Drawing Sheets

WRAPPED STATOR COIL FOR USE IN A GENERATOR

FIELD OF THE INVENTION

The present invention relates to a wrapped stator coil for use in a generator and, more particularly, to such a stator coil having an interwoven layer structure comprising insulating material and a first conductive glass material disposed about an insulating layer structure.

BACKGROUND OF THE INVENTION

High voltage stator coils use a conductive outer ground electrode to make certain the outer surface of the high voltage coils is at ground potential. These coils further include ground wall insulation generally comprised of multiple layers of glass backed mica paper tape. The outer ground electrode is defined by an outer layer of conductive tape loaded with carbon or graphite to control and set its conductivity. During a subsequent impregnation and heat cure process of the stator coil, shrinkage occurs in the conductive tape, which causes the tape to conform to the surface below it.

In some stator coils, the layer of conductive tape is wrapped in a half lap layer manner and applied over the last layer of mica paper tape that is also wrapped in a half lap layer. This method, while somewhat successful, causes protrusions of either the conductive tape or the mica layer.

The smoothness of the conductive tape layer has an influence on the electrical properties of the outer ground electrode. Protrusions of either the conductive tape or the mica tape below it can produce regions of locally enhanced electrical stress. Increased local electrical stress can cause locally produced partial discharges, which can lead to damage of the coil's outer ground electrode.

SUMMARY OF THE INVENTION

In accordance with a first aspect of the present invention, a wrapped stator coil for use in a generator is provided comprising: an electrical conductor coil; an insulating layer structure disposed about the electrical conductor coil; an interwoven layer structure disposed about the insulating layer structure and comprising insulating material and a first conductive material; and a conductive layer structure disposed about the interwoven layer structure and comprising a second conductive material.

The second conductive material may have a lower electrical resistance than the first conductive material.

The insulating layer structure may comprise multiple layers of a glass backed mica paper tape.

The insulating material of the interwoven layer structure may comprise glass backed mica paper tape.

The first conductive material may comprise an electrically conductive glass tape comprising glass reinforcement fibers.

The mica paper tape may be wound once for every one wind of the conductive glass tape.

The mica paper tape and the conductive glass tape may be wound in an overlapping manner.

In accordance with a second aspect of the present invention, a method is provided for forming a wrapped stator coil comprising: providing an electrical conductor coil; forming an insulating layer structure about the electrical conductor coil; wrapping an insulating material and a first conductive material in an interwoven manner about the insulating layer structure to define an interwoven layer structure; and wrapping a second conductive material about the interwoven layer structure.

Wrapping an insulating material and a first conductive material may comprise winding the mica paper tape and the conductive glass tape concurrently in an overlapping manner.

The mica paper tape may be wound once for every one wind of the conductive glass tape.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
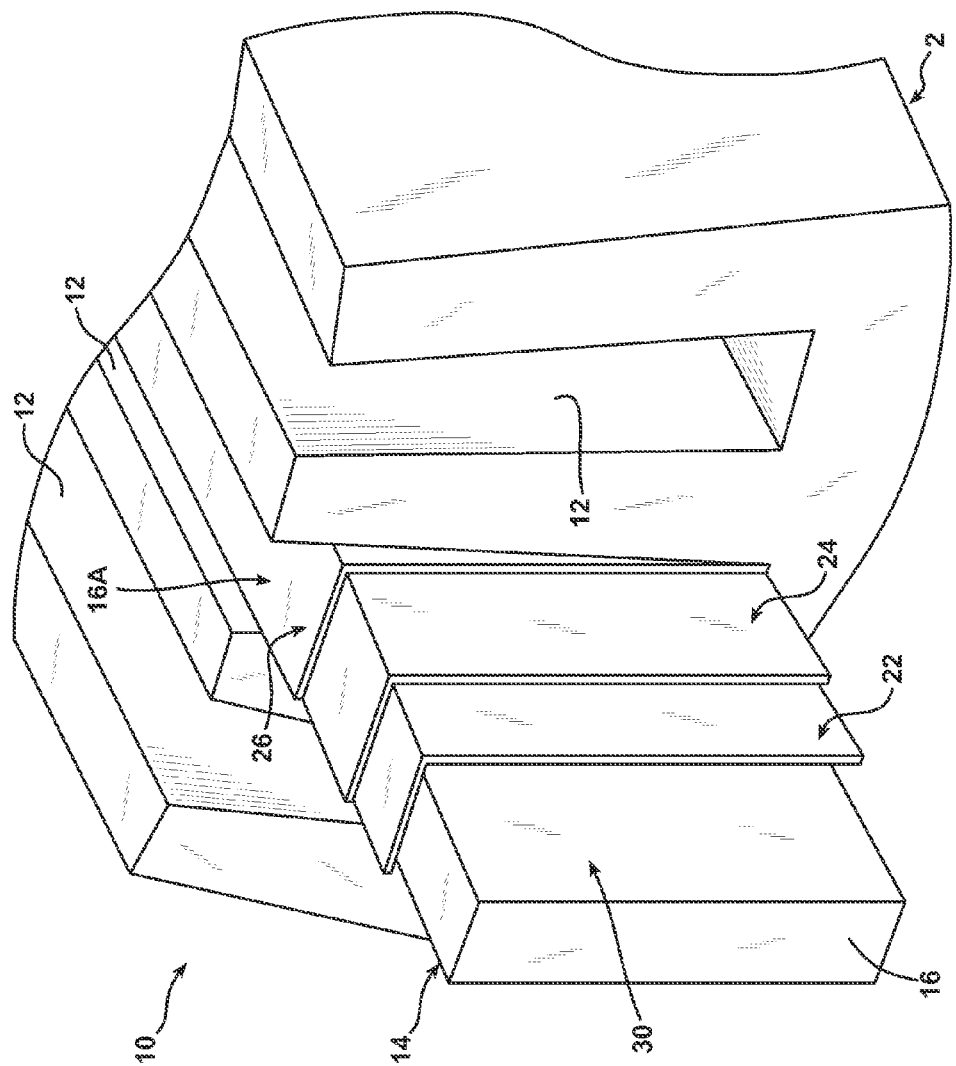
FIG. 1 illustrates a perspective view of a portion of a stator for a generator core and including a partial cut away view of a wrapped stator coil according to an embodiment of the present invention.
Figure 4:
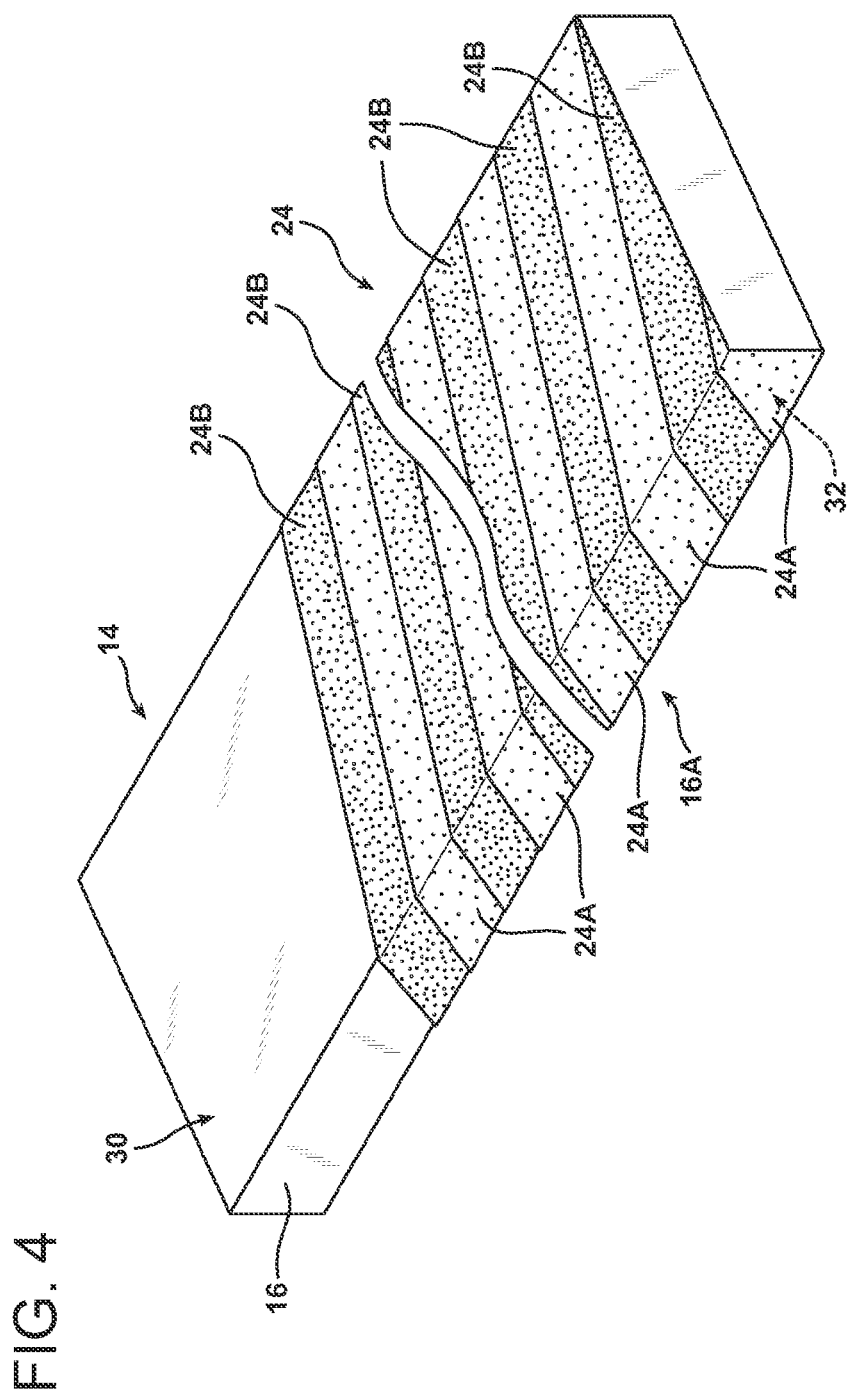
FIG. 4 is a perspective view of the wrapped stator coil shown in FIG. 1 illustrating only the interwoven layer structure while having the dielectric insulating layer structure and the conductive outer layer structure removed.

Referring to FIG. 1, a portion of a supporting body or core 2 of a stator 10 in an electrical generator is illustrated including a plurality of slots 12, where each slot is adapted to receive a wrapped stator coil 14 (only one shown in FIG. 1). As additionally seen in FIG. 2, the wrapped stator coil 14 generally comprises an electrical conductor bar or coil 16, which may comprise one or more electrical conductors bundled together. The electrical conductor bar 16 includes a substantially straight portion 16A, see FIGS. 1 and 4. The electrical conductor bar 16 may also include a first end turn (not shown) adjacent to a first end portion 30 of the straight portion 16A, and a second end turn (not shown) adjacent to a second end 32 of the straight portion 16A. The end turns of the electrical conductor bar 16 may be electrically connected to end turns of a second electrical conductor bar (not shown) to form a full stator coil about a rotor (not shown) of the electrical generator.

The wrapped stator coil 14 may also comprises an inner corona protection system (not shown) provided over the straight portion 16a of the electrical conductor bar 16. Such a corona protection system may comprise the one disclosed in U.S. Pat. No. 8,395,296, by Emery, filed on Sep. 16, 2009 and entitled "Tape Structure with Conductive Outer Side and Electrically Insulating Inner Side," the entire disclosure of which is incorporated herein by reference.

Figure 2:
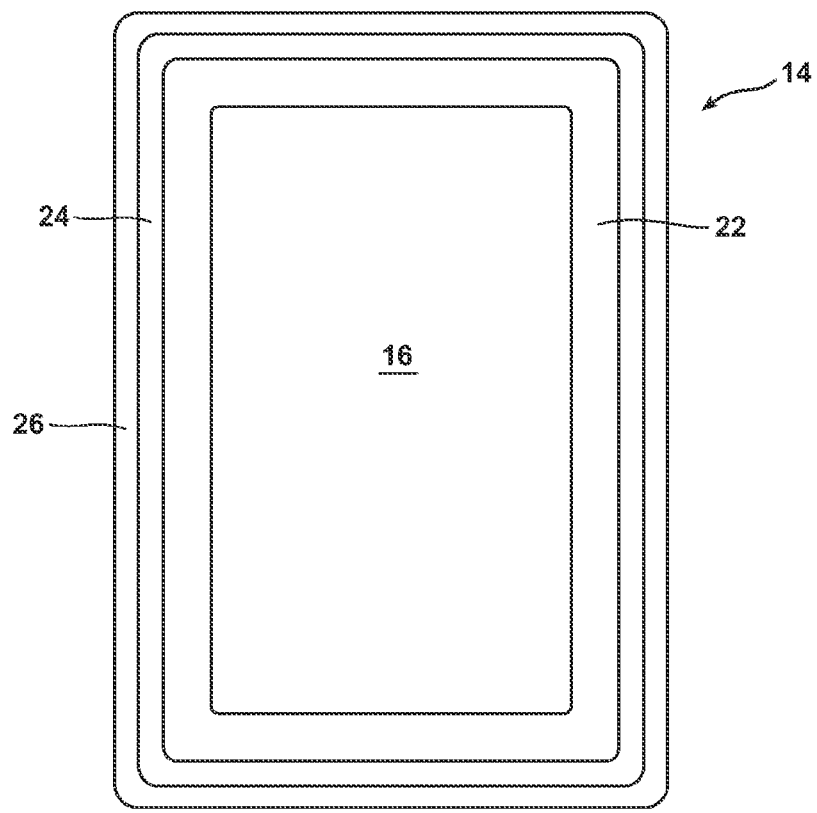
FIG. 2 is a schematic sectional view of the wrapped stator coil in FIG. 1.
Figure 3:
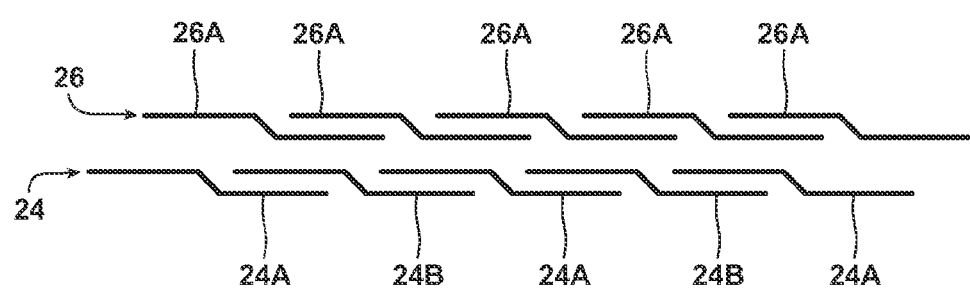
FIG. 3 is a schematic side view illustrating an interwoven layer structure and a conductive outer layer structure of the wrapped stator coil in FIG. 1.

The wrapped stator coil 14 may further comprise a dielectric insulating layer structure 22, also known as a groundwall, which may comprise one or more wrapped high voltage insulation layers, each layer comprising in the illustrated embodiment a glass backed resin impregnated mica paper tape, wherein the resin may comprise MICA-LASTIC or THERMALASTIC (MICALASTIC is registered trademark of Siemens Aktiengesellschaft Corporation and THERMALASTIC is a registered trademark of Siemens Energy Inc.). An example of such a glass backed resin impregnated mica paper tape comprises one which is commercially available from Isovalta AG under the product designation Poroband 0410. The one or more insulating layers defining the insulating layer structure 22 may be half lapped, i.e., with an overlap, such as 50%, between adjacent wraps, and provided over the inner corona protection system if provided, and, if not provided, directly over the electrical conductor bar 16. The dielectric insulating layer structure 22 may extend along about all or a substantial portion of the straight portion 16*a* of the electrical conductor bar 16. Further, the insulating layer structure 22 may be disposed about the end turns of the electrical conductor bar 16. The dielectric insulating layer 22 is illustrated in FIGS. 1 and 2, but is not shown in FIGS. 3 and 4.

The wrapped stator coil 14 may further comprise over the dielectric insulating layer structure 22 an interwoven layer structure 24. The interwoven layer structure 24 may comprise insulating material 24A and a first electrically conductive material 24B, shown in FIGS. 3 and 4. The insulating material 24A may comprise a glass backed resin impregnated mica paper tape, such as the one described above and used to form the dielectric insulating layer structure 22. The first conductive material 24B may comprise a first electrically conductive tape, which is resistant to damage from high temperature electrical discharges, which are discussed below. An example of such a conductive tape comprises one having glass reinforcement fibers and conductive carbon embedded in an epoxy resin, which is commercially available from Isovolta AG under the product designation "Contafel® 3080." The mica paper tape defining the insulating material 24A and the conductive glass reinforced tape defining the first conductive material 24B may be wound concurrently in an overlapping manner such that the mica paper tape may be wound once for every one wind of the conductive glass tape. More specifically, the mica paper tape defining the insulating material 24A and the conductive glass tape defining the first conductive material 24B may be half lapped such that each wrap of the mica paper tape or the conductive glass tape overlaps an adjacent wrap of the conductive glass tape or the mica paper tape by about 50 percent, see FIG. 3. It is noted that the mica paper tape provides some electrical isolation between the first conductive material 24B and a conductive outer layer structure 26, discussed below, wherein the conductive outer layer structure 26 has a lower resistance than the first conductive material 24B.

The wrapped stator coil 14 may still further comprise the conductive outer layer structure 26 disposed about the interwoven layer structure 24. The conductive outer layer structure 26 may comprise a second electrically conductive material, and preferably is capable of shrinking during a subsequent impregnation and heat cure process. The conductive outer layer structure 26 may comprise a polyester electrically conductive tape 26A, one of which is commercially available from Isovolta AG under the product designation "Contafel® H 0865." The polyester tape 26A may be half lapped such that each wrap of the polyester tape 26A overlaps a prior wrap of the polyester tape by about 50 percent, see FIG. 3. The polyester conductive tape 26A may shrink about 10% during the subsequent impregnation and heat cure process of the stator coil 14. This shrinkage causes the tape 26A to conform to the surface below it and, hence, functions to hold the wrapped structures 22, 24 and 26 on the electrical conductor bar 16. It is also noted that the polyester conductive tape 26A is not abrasive and, as a result, does not damage the supporting body 2 when the stator coil 14 is positioned in a corresponding slot 12. The electrical resistance of the polyester conductive tape 26A is much lower than that of the conductive tape used in the interwoven layer structure 24 comprising glass reinforcement fibers and conductive carbon embedded in an epoxy resin. In the illustrated embodiment, the Contafel® 3080 defining the first conductive material 24B has a resistance of about 5-7 Kohms/square while the Contafel® H 0865 defining the polyester conductive tape 26A has a resistance of about 0.94 Kohms/square. It is noted that because the Contafel® H 0865 defining the polyester conductive tape 26A has a lower resistance than the first conductive material 24B, the Contafel® H 0865 is more suitable for being in contact with the support structure 2 so as to suppress stator coil 14 to structure 2 surface discharges.

The interwoven layer structure 24 and the conductive outer layer structure 26 define a conductive outer ground electrode such that the outer surface of the high voltage wrapped stator coil 14 is at ground potential. As noted above, the half lapped dielectric insulating layer structure 22 is provided between the electrical conductor bar 16 and the interwoven layer structure 24. As also noted above, the interwoven layer structure 24 comprises, in the illustrated embodiment, the mica paper tape and the conductive glass tape half lapped such that each wrap of the mica paper tape or the conductive glass tape overlaps an adjacent wrap of the conductive glass tape or the mica paper tape. Because the dielectric insulating layer structure 22 and the interwoven layer structure 24 are half lapped, protrusions may result in surfaces of one or both of the dielectric insulating layer structure 22 and the interwoven layer structure 24 facing one another. It is known that protrusions in layer structures in a wrapped stator coil can produce regions or points of locally enhanced electrical stress. Increased local electrical stress points can cause locally produced partial discharges, which can lead to damage to some conductive outer layer structures. However, in the present invention, because the interwoven layer structure 24 is defined by an insulating material 24A comprising a mica paper tape and a first conductive material 24B comprising a conductive tape including glass reinforcement fibers, which mica paper tape and glass tape have a high resistivity to damage from high temperature sparks, any electrical discharge activity creating high temperature sparks occurring in the protrusions formed in one or both of the dielectric insulating layer structure 22 and the interwoven layer structure 24 cause little or no damage to the interwoven layer structure 24. Such high temperature sparks, if exposed directly to the conductive outer layer structure 26 comprising the polyester conductive tape 26A, could damage the polyester tape 26A. However, because the interwoven layer structure 24 is provided beneath the polyester conductive tape 26A, the polyester conductive tape 26A is not directly exposed to those high temperature sparks occurring within the protrusions formed in one or both of the dielectric insulating layer structure 22 and the interwoven layer structure 24 and, hence, is not damaged by those high temperature sparks.

It is noted that further protrusions may be formed in surfaces of one or both of the interwoven layer structure and the conductive outer layer structure 26 facing one another. However, voltage stresses on these protrusions are greatly reduced by shielding effects of the interwoven layer structure 24, i.e., the first conductive material 24B prevents the build-up of voltage at the protrusions formed in one or both of the interwoven layer structure and the conductive outer layer structure 26.

The interwoven layer structure 24 and the conductive outer layer structure 26 are substantially fixed to the walls of a corresponding stator slot 12 by an impregnating bonding resin that will be described below. The interwoven layer structure 24 and the conductive outer layer structure 26 may be disposed about all or a substantial portion of the straight portion 16a of the electrical conductor bar 16, but are typically not disposed over the end turns of the electrical conductor bar. It is noted that the insulating layer 22, the interwoven layer structure 24 and the conductive outer layer structure 26 are illustrated schematically and have been broken away in FIG. 1 for clarity.

A process for forming the wrapped stator coil 14 will now be described. An insulating layer structure, such as the dielectric insulating layer structure 22 described above, is wrapped about the straight portion 16a of the electrical conductor bar 16 and, if provided, an inner corona protection system. The insulating layer 22 may be half lapped with an overlap between adjacent wraps, and may also be applied over end turns of the electrical conductor bar 16.

Next, the interwoven layer structure 24 is wrapped about the dielectric insulating layer structure 22. As noted above, the interwoven layer structure 24 may comprise an insulating material 24A such as a glass backed resin impregnated mica paper tape, and a first conductive material 24B, such as a tape comprising glass reinforcement fibers and conductive carbon embedded in an epoxy resin. The mica paper tape defining the insulating material 24A and the conductive glass tape defining the first conductive material 24B are preferably wound concurrently in an overlapping manner such that the mica paper tape may be wound once for every one wind of the conductive glass tape. Each layer may overlap an adjacent layer by about 50 percent.

Thereafter, the conductive outer layer structure 26 comprising a second conductive material, such as a polyester conductive tape 26A, is wrapped about the interwoven layer structure 24. Preferably, the polyester tape 26A is half lapped such that each wrap of the polyester tape 26A overlaps a prior wrap of the polyester tape by about 50 percent.

After the outer layer structure 26 is wrapped about interwoven layer structure 24, subsequent steps can be taken to prepare the wrapped stator coil 14 for use in an electrical generator. For example, a single one of the wrapped stator coils 14 may be subjected to a vacuum pressure impregnation (VPI) process, also referred to as a single vacuum pressure impregnation (SVPI) process, which involves impregnating bonding resin, such as an epoxy resin, through the materials of the single wrapped stator coil 14. Alternatively, a plurality of the wrapped stator coils 14 may be combined and connected in the supporting body 2 to form an integral coil structure, in which case the integral coil structure may be subjected to a global vacuum pressure impregnation (GVPI) process, which involves impregnating bonding resin, such as an epoxy resin, through the materials of the integral coil structure. It is noted that, if a VPI process is used to impregnate bonding resin through the materials of a single wrapped stator coil 14, an accelerator, such as zinc naphenate, may be incorporated into the bonding resin impregnated through the materials of the single wrapped stator coil 14. The accelerator facilitates a proper curing of the impregnated bonding resin in the various layers of the wrapped stator coil 14. Alternatively, if a GVPI process is used to impregnate bonding resin through the materials of the integral coil structure, the insulating layer 22 may include the accelerator, in which case the bonding resin need not include the accelerator.

Further subsequent steps may include curing the layers of the wrapped stator coil 14 (or the integral coil structure) at high temperatures such as 160 to 175 degrees C., and inserting and then fixing the wrapped stator coil 14 (or the integral coil structure) into a stator slot, such as the slot 12 described above. It is noted that the impregnation and curing procedures may be performed prior to the inserting of the wrapped stator coil 14 into the stator slot 12, or the wrapped stator coil 14 may be inserted into the stator slot 12 prior to the impregnation and curing procedures.

Two wrapped stator coils were prepared and tested at 400 hours of voltage (32 KVAC) at a temperature of 170 degrees C. The first wrapped stator coil was constructed in accordance with the present invention and comprised an electrical conductor coil; an insulating layer structure defined by a glass backed resin impregnated mica paper tape disposed about the electrical conductor coil; an interwoven layer structure disposed about the insulating layer structure and comprising insulating material comprising a glass backed resin impregnated mica paper tape and a first conductive material comprising a tape including glass reinforcement fibers and conductive carbon embedded in an epoxy resin; and a conductive layer structure comprising an electrically conductive polyester tape disposed about the interwoven layer structure. The second wrapped stator coil comprised an electrical conductor coil; an insulating layer structure defined by a glass backed resin impregnated mica paper tape disposed about the electrical conductor coil; and a conductive outer layer structure comprising an electrically conductive polyester tape. The first wrapped stator coil performed much better than the second wrapped stator coil. The second wrapped stator coil had damaged portions resulting from discharge activity.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A wrapped stator coil for use in a generator comprising:
an electrical conductor coil;
an insulating layer structure disposed about the electrical conductor coil;
an interwoven layer structure disposed about the insulating layer structure and comprising insulating material and a first conductive material; and
a conductive layer structure disposed about the interwoven layer structure and comprising a second conductive material,
wherein the second conductive material has a lower resistance than the first conductive material.

2. The wrapped stator coil as set out in claim 1, wherein the insulating layer structure comprises multiple layers of a glass backed mica paper tape.

3. The wrapped stator coil as set out in claim 1, wherein the insulating material of the interwoven layer structure comprises glass backed mica paper tape.

4. The wrapped stator coil as set out in claim 3, wherein the first conductive material comprises an electrically conductive tape comprising glass reinforcement fibers.

5. The wrapped stator coil as set out in claim 3, wherein the first conductive material comprises a conductive glass tape.

6. The wrapped stator coil as set out in claim 5, wherein the mica paper tape is wound once for every one wind of the conductive glass tape.

7. The wrapped stator coil as set out in claim 5, wherein the mica paper tape and the conductive glass tape are wound in an overlapping manner.

8. A method for forming a wrapped stator coil comprising:
providing an electrical conductor coil;
forming an insulating layer structure about the electrical conductor coil;
wrapping an insulating material and a first conductive material in an interwoven manner about the insulating layer structure to define an interwoven layer structure; and
wrapping a second conductive material about the interwoven layer structure,
wherein the second conductive material has a lower resistance than the first conductive material.

9. The method as set out in claim 8, wherein the insulating layer structure comprises multiple layers of a glass backed mica paper tape.

10. The method as set out in claim 8, wherein the insulating material of the interwoven layer structure comprises glass backed mica paper tape.

11. The method as set out in claim 10, wherein the first conductive material comprises a conductive glass tape.

12. The method as set out in claim 11, wherein wrapping an insulating material and a first conductive material comprises winding the mica paper tape and the conductive glass tape concurrently in an overlapping manner.

13. The method as set out in claim 12, wherein the mica paper tape is wound once for every one wind of the conductive glass tape.

* * * * *